March 3, 1942.  F. W. ADAMS  2,274,643
FINING OF GLASS
Filed Dec. 19, 1939
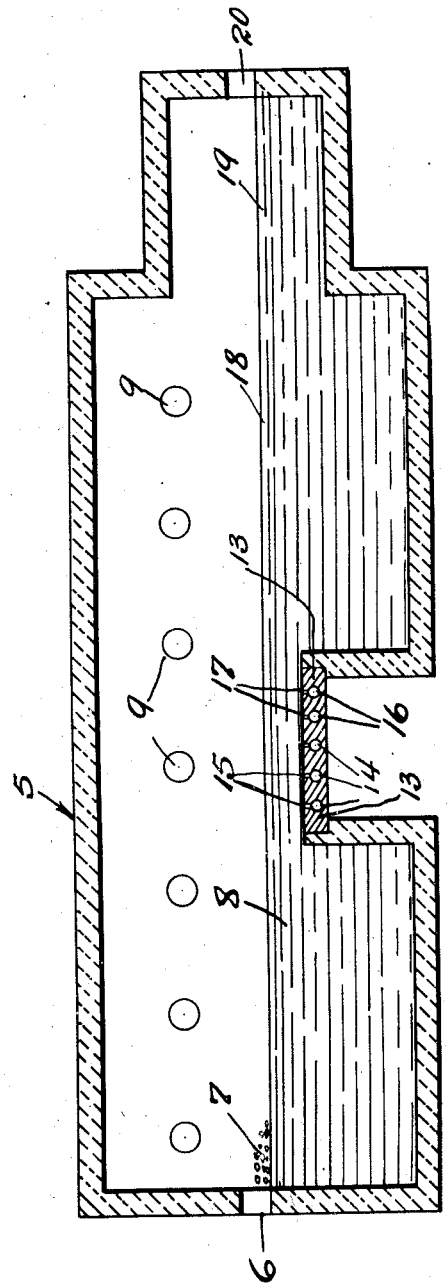
INVENTOR
FREDERICK W. ADAMS
BY Olew E. Bee
ATTORNEY.

Patented Mar. 3, 1942

2,274,643

UNITED STATES PATENT OFFICE 2,274,643

FINING OF GLASS

Frederick W. Adams, Pittsburgh, Pa., assignor to Pittsburgh Plate Glass Company, Allegheny County, Pa., a corporation of Pennsylvania Application December 19, 1939, Serial No. 310,002

4 Claims. (Cl. 49—77)

The present invention relates to the treatment of glass and it has particular relation to the treatment of glass while it is in molten state for purposes of removing gaseous constituents therefrom.

One object of the invention is to provide a process of so treating glass in molten state as substantially completely to eliminate bubbles or "seed" therefrom.

A second object of the invention is to provide a process by application of which water or its vapors may be eliminated from molten glass.

These and other objects of the invention will be apparent by consideration of the following specification and the appended claims.

In the manufacture of glass, sand (silica) and compounds, such as calcium carbonate, sodium carbonate, or equivalent alkali and alkali earth compounds, are admixed and fused together into a homogeneous mass. The formation of the glass is accompanied by liberation of large amounts of gases, such as carbon dioxide, sulphur dioxide, water vapor and the like. Most of these gases collect in relatively large bubbles which make their way to the surface of the molten body and escape. This escape is promoted by a fining operation involving heating the molten gas until it becomes relatively fluid, e. g. to a temperature of about 2200 to 2700 degrees F., dependent somewhat upon the fusing characteristics of the glass. However, it is difficult to obtain the glass in such fluid condition that the smaller bubbles of gas can make their way to the surface. In order to promote the escape of the smaller bubbles it is common practice to throw into the body of molten glass organic substances such as potatoes, apples, coal, charcoal, or the like, which by reason of internal decomposition or by reason of reaction with the constituents of the glass are capable of liberating large volumes of gases. The profuse evolution of gases engendered results in the formation of very large bubbles, which readily make their way to the surface of the molten glass and in so doing tend to collect and carry along the smaller bubbles or seeds which are suspended in the glass. However, even the sweeping action produced is not sufficient to carry away all of the gases and this is particularly true of water vapors which seem to be very intimately or very tenaciously associated with the molten glass. The various residual gases, or vapors contained in the glass tend to collect in minute bubbles which as the glass cools become permanently entrapped. In quality products, such as plate glass, mirrors and the like, the bubbles or "seeds," as they are termed, are highly objectionable.

The present invention is based upon the discovery that by blowing molten glass with carbon monoxide it is possible to remove or sweep out nearly all of the gaseous seeds contained therein and in particular it is possible to a very large degree to eliminate water or its vapors which heretofore it has been practically impossible to remove.

For a better understanding of the invention reference may now be had to the accompanying drawing in which like numerals refer to like parts throughout and in which the single view is a section through a tank or furnace.

Contact of the molten glass with carbon monoxide may be effected by simply bubbling the gas through it in any convenient refractory pot or container that can be heated to the desired temperature. The apparatus as shown includes a tank 5 formed of refractory material in accordance with conventional practice. This tank is provided at one end with an opening 6 for the introduction of the constituents of the glass batch which for a time remain unmelted as indicated at 7. Heat is applied to the material in the tank by appropriate means, for example, by combustion of fuel gases introduced above the surface of the pool of molten glass 8 by means of ports 9, extending through the sides of the tank. Material introduced into the tank through the opening 6 is gradually fused down into the pool of glass which flows along the tank and from which the gaseous constituents gradually escape as bubbles. In order to promote this escape a dam or bridge 13 is disposed across an intermediate portion of the tank with the upper edge thereof disposed a short distance below the surface of the pool of molten glass. This bridge, preferably, is provided with a series of conduits 14 extending transversely of the tank and having numerous small openings 15 formed on the upper side thereof to admit of the escape of carbon monoxide into the thin stream or layer of molten glass passing over the surface of the bridge. A second series of conduits 16 having outlet openings 17 for admission of air or oxidizing gas into the glass may, also, be provided.

The molten glass flowing over the bridge 13 is received into a pool 18 in which it is allowed to stand for a period of time in order to permit any bubbles of gas more effectively to escape. Escape of gases may be promoted by application of vacuum to the molten body while it is quiescent. Ultimately the glass reaches a forehearth or drawing zone 19 from which the glass may be drawn out through opening 20 into sheets or cast or formed in any desired manner.

In the operation of the furnace, sand, lime, soda ash, potash and/or other common glass batch ingredients, such as borax, barium compounds, lead compounds, etc. are fed in through opening 6. The temperature of operation of the furnace above described will depend to considerable degree upon the fusing temperature of the glass body therein and this in turn will depend upon the constituency of the glass. However, for most purposes a temperature within a range of about 2000 to 2700 degrees F. is to be preferred. For window glass the temperature of the glass in the zone which is undergoing treatment with carbon monoxide may be approximately 2200 degrees F. or above. For some forms of more heat-resistant glass a temperature of about 2600 degrees F. is to be preferred.

The rate of flow of the carbon monoxide through the glass is susceptible of considerable variation. Of course the less vigorous the flow the longer will be the period of treatment that will be required. The period of treatment may vary over a considerable range, depending upon the thoroughness of degasification of the glass desired. Within a period of about 1 or 2 hours under the conditions above specified approximately 50 per cent of the water vapors contained in the glass will be eliminated. At the conclusion of a period of about 4 hours water vapor elimination will be approximately 76 per cent. Simultaneously other gases, such as carbon dioxide, sulfur dioxide and hydrogen will be almost completely eliminated.

The bubbling of carbon monoxide through the glass ultimately results in the production of a distinct brownish coloration in the latter. This constitutes a criterion of the degree of degasification of the glass body. Usually, after it becomes pronounced, treatment should be halted. Since the brown coloration within itself is sometimes objectionable, it is desirable to subject the glass while in molten condition to treatment in order to eliminate it. This conveniently may involve bubbling air or an oxidizing gas through the conduits 16 into the molten glass. Usually by blowing the glass with air for the period of about 1 hour the color is satisfactorily removed. When the glass is permitted to stand quiescent in the pool 18 for a short period of time, practically all of the bubbles of air escape and there is obtained a body of glass which is practically free of gases and water vapor. The glass can be drawn or cast or otherwise formed into bodies and then annealed by slow cooling in accordance with conventional practice. The glass is free of bubbles or seed and is highly suitable for the formation of lenses, plate glass, glass marbles for spinning glass fibers, or for the formation of optical glass, or other forms of glass in which bubbles and seed would be objectionable.

It may, also, be possible to remove water vapor from molten glass simply by contacting a thin layer of glass with carbon monoxide gas for a period of several hours under relatively non-oxidizing conditions. Some of the gas will be absorbed and may be released by allowing the molten glass to stand either with or without application of vacuum.

It is, of course, recognized that the combination gases in a glass furnace may, at times, contain some carbon monoxide. However, it will, also, be recognized that the percentages of carbon monoxide actually contacting the glass under ordinary operating conditions are small. Likewise, the products of combustion will be ladened with percentages of water far exceeding the percentage of carbon monoxide and will further contain considerable amounts of oxygen. Under these conditions, it does not appear that the carbon monoxide is effective as a degasifying agent.

It will be apparent that the carbon monoxide employed in the present process may contain considerable amounts of other gases, such as nitrogen or carbon dioxide, and these gases may amount to as much as fifty or even seventy-five per cent of the whole, but the percentage of oxygen and water vapor must be low. For example, these gases should not equal more than a few percent of the carbon monoxide content.

Applicant's process, in addition to being effective to remove water vapors, also effectively removes oxygen gas, such as often occurs in optical glass.

The form of invention herein disclosed is to be considered merely as exemplary. It will be apparent that numerous modifications may be made therein without departure from the spirit of the invention or the scope of the appended claims.

What I claim is:

1. A process of removing gases and water vapor from glass, which process comprises contacting the glass in molten state with carbon monoxide until a brown coloration results, then bubbling an oxidizing gas through the molten glass, in order to eliminate the coloration.

2. A process of removing gases and water vapor from glass, which comprises bubbling carbon monoxide gas through the glass the latter being molten and at a temperature above 2200 degrees F. until a brown coloration results, then bubbling an oxidizing gas through the glass to eliminate coloration and subsequently allowing the glass to stand quiescent until any bubbles contained therein can escape.

3. A process of eliminating gases including water vapor from glass, which process comprises bubbling carbon monoxide through the glass while the latter is in molten state for a period of one hour and upward, then further treating the molten glass with an oxidizing gas to remove color.

4. A process of eliminating gases including water vapor from glass, which process comprises bubbling carbon monoxide containing gas which is free of oxygen and water vapor through the glass while it is in molten state for a period of one hour and upward, and subsequently treating the molten glass with an oxidizing gas.

FREDERICK W. ADAMS.